Figure 1:
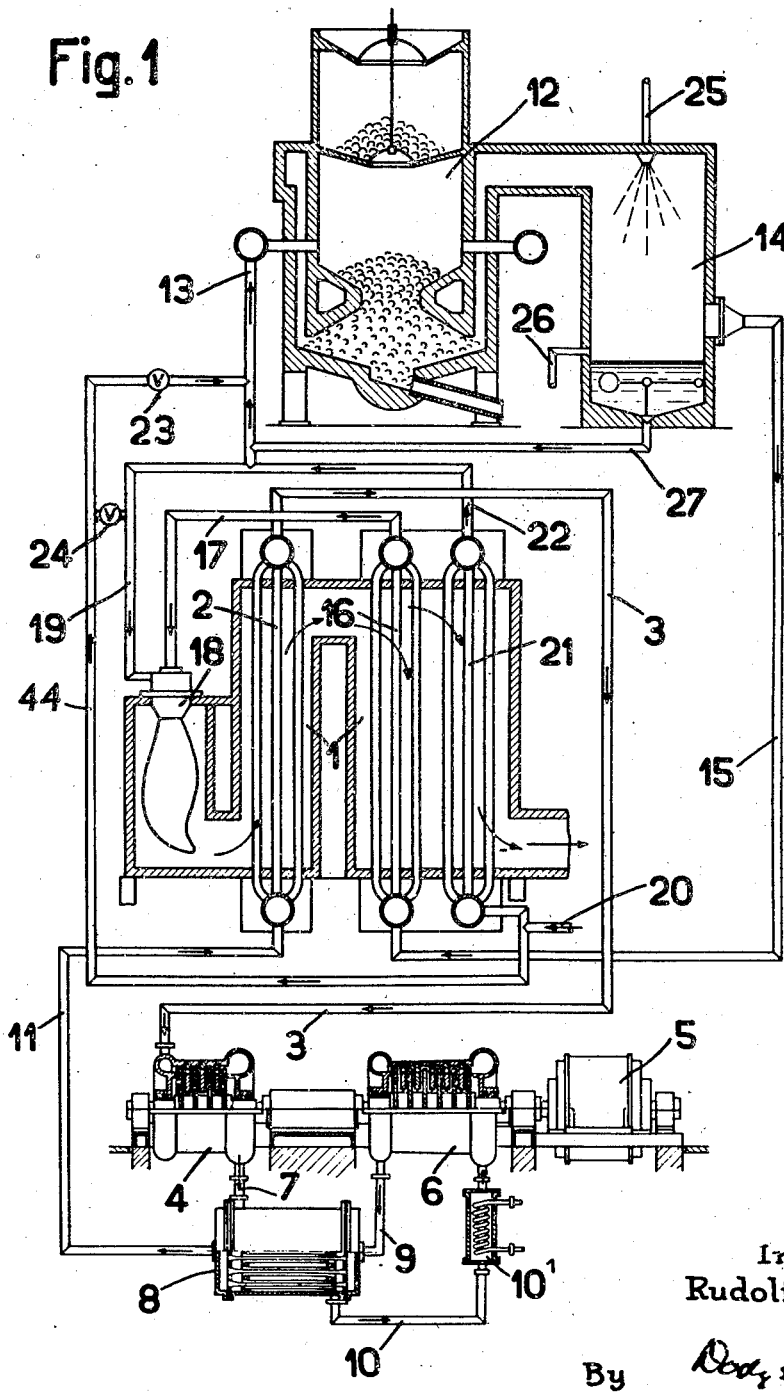

Inventor
Rudolf Ruegg

Patented Nov. 19, 1946

2,411,294

UNITED STATES PATENT OFFICE 2,411,294

THERMAL POWER PLANT

Rudolf Ruegg, Zurich, Switzerland, assignor to Aktiengesellschaft Fuer Technische Studien, Zurich, Switzerland, a corporation of Switzerland Application August 28, 1944, Serial No. 551,610
In Switzerland July 17, 1943

7 Claims. (Cl. 158—1)

This invention relates to a thermal power plant in which a gaseous working medium describes a circuit, whereby it is brought to a higher temperature by an indirect supply of heat from an outside source in a heater connected to at least one gas producer, then expanded for the purpose of giving up energy externally and afterwards again brought to a higher pressure before entering the heater. By the installation of a gas producer in plants of this type, the use also of cheap coal which has not been subject to any preparation process, as also fuels with a high water content, such as lignite and the like, becomes possible, so that the range of application of these plants can be greatly extended.

The object of the invention is to improve the economy of such plants by as complete a utilization as possible of the heat contained in the flue gases of the heater provided for the heating of the working medium. For this purpose according to the present invention the heating system of the heater, wherein heat from an external source is supplied to the working medium, is (viewed in the direction of flow of the flue gases) followed by heating systems which are traversed by at least the greater part of the fresh air to be supplied to the gas producer, further by the heating gas obtained in said producer and also by at least the greater part of the air required in the heater for the combustion of said heating gas. In a heater of this kind the flue gas temperature can be lowered to a very considerable extent and a good efficiency thus attained therein.

In gas heaters for thermal power plants of the kind referred to with a closed circuit for the working medium and regeneration of the heat contained in the exhaust of the turbine, the waste gas temperature of the flue gases is mostly high, for example higher than in steam boilers. The proposed combination and concentration of all volumes of air and gas that have to be heated, permits also in such plants said high waste gas temperature occurring in the air heater being reduced to a considerable extent and the economy of the plant increased as a result. At the same time new possibilities for the operation of the gas producer are realized, which are only possible in the proposed combination with the air heater.

The air required in the gas producer can in this way be raised in the heater to a temperature of at least 400° C. This makes it possible to use in the producer even fuels with a high water content such as for example lignite (brown coal) without a previous drying process being necessary. Furthermore with such high temperatures of the air supplied to the producer those temperatures can be reached in the latter which are required for removal of the ash in liquid form. Such gas producers offer the advantage that they can be designed of smaller dimensions than ordinary producers and that owing to the liquid ash extraction it is possible to remove a higher percentage of the slag than in ordinary producers, so that correspondingly less ash particles are contained in the heating gases actually generated.

When gasifying fuels having a high water content and which have not been previously dried, the humidity contained in said fuel is given off to the heating gases generated in the gas producer. In view of this it is advisable to provide between the gas producer and the heater some means for cooling and purifying the heating gases, wherein the water vapour and tarry products contained in these gases can be separated. Separation of the water vapour offers the advantage that the heating value of the gas can be raised which again is insofar important as the maximum efficiency attainable in the heater of a thermal power plant is largely dependent on the calorific value of the fuel and becomes greater the higher the calorific value of the heating gas.

Figure 2:
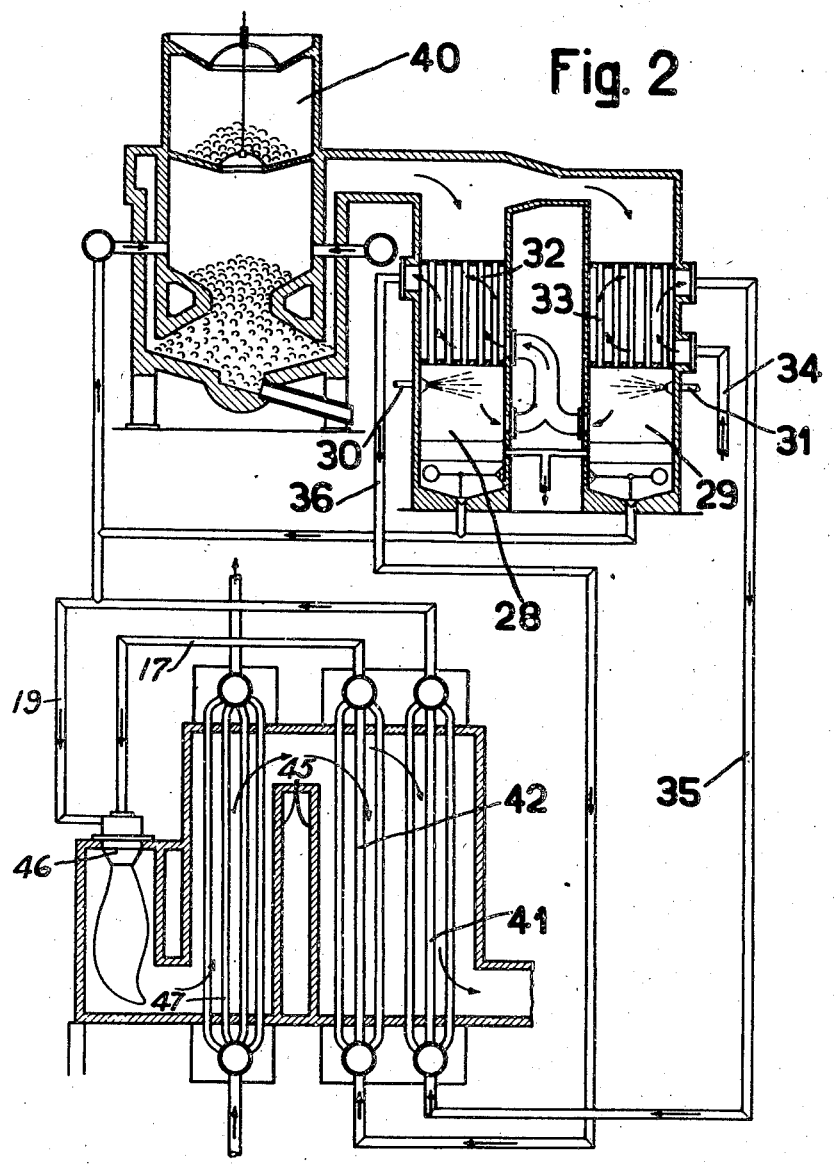

Two preferred embodiments of this invention are illustrated by way of example and in a simplified mode of representation in the accompanying drawings in which:

Fig. 1 shows a thermal power plant comprising a gas producer in which the heating gas issuing from the latter is cooled and purified, and Fig. 2 a thermal power plant with gas producer in which two heat exchangers are combined with means for cooling and purifying the heating gases issuing from the gas producer.

In Fig. 1 the numeral 1 denotes a heater in which a working medium, preferably air, describing a closed cycle in a thermal power plant, is to be heated. The heating of this working medium takes place in a surface heat exchanger, illustrated as a tubular heat exchanger 2 over which play the combustion gases generated in a manner subsequently described herein. Exchanger 2 is the main heater for the working medium. Heating of the working medium in heater 1 can conveniently be effected up to at least 500° C. The working medium thus heated passes through a pipe 3 into a turbine 4 where it expands whilst giving up energy to a machine 5 which, for example, can take the form of an electric generator. The turbine 4 simultaneously drives a turbo-compressor 6. The expanded working medium issuing from the turbine 4 passes through a pipe 7 into a surface heat exchanger 8 of the counter-current type, where it gives up heat to the working medium that has been compressed by the compressor 6 and which flows through a pipe 9 from compressor 6 to this heat exchanger 8. After having given up heat in the heat exchanger 8 the expanded working medium passes through a pipe 10 and a cooler 10¹ into the compressor 6, whilst the working medium of higher pressure, which has taken up heat in the heat exchanger 8, passes through a pipe 11 into the tubular heat exchanger 2 of the heater 1.

The numeral 12 denotes a gas producer that is designed for removal of the ash in liquid form and to which fresh air is supplied through a pipe 13. The heating gas generated in this producer 12 passes through a cooler and purifier 14 into a pipe 15 and then into a heating system designed in the form of a tubular surface heat exchanger 16, which is disposed within the heater 1 and, with respect to the direction of flow of the flue gases, is arranged beyond the heat exchanger 2. The heating gas, the temperature of which has been raised in the heat exchanger 16, passes through a pipe 17 to a burner 18 of the heater 1. This burner 18 also receives previously heated fresh air through a pipe 19. The mixture of generated gas and preheated fresh air is burnt in the burner 18 and provides the combustion gases required for heating the working medium of the thermal power plant. The fresh air required for the operation of the gas producer 12 and of the burner 18 is supplied through a pipe 20 and passes from the latter, if not always entirely, at least for the greater part, into a heating system 21 designed as a tubular surface heat exchanger, which is likewise accommodated in the heater 1 and, with respect to the direction of flow of the flue gases, is arranged beyond the heat exchanger 16 and thus also beyond the main heat exchanger 2. The fresh air heated in the heat exchanger 21 passes into a pipe 22 from which the fresh-air pipe 13 leading to the producer 12 and the fresh-air pipe 19 leading to the burner 18 branch off. The numerals 23 and 24 denote adjustable control devices, through which a part of the fresh air supplied through pipe 20 by-passes the heat exchanger 21 and can gain access direct to pipe 13 and pipe 19. The by-pass is indicated at 44. In this manner the final temperature of the volumes of air required in the gas producer 12 and burner 18 can be influenced independently of one another. The cooling in cooler 14 of the gases issuing from producer 12 is effected by water, which is supplied through a pipe 25, and effects condensation of the water vapour and tarry products contained in the heating gases. The water collecting at the bottom of cooler 14 flows away through a pipe 26, whilst the tarry products pass through a pipe 27 to pipe 13, where they mix with hot fresh air; as a result the tarry products evaporate and thus are reconveyed into the gas producer 12. The heating gases passing to heat exchanger 16 from cooler 14 are relatively cold and therefore can extract a relatively large amount of heat from the flue gases of heater 1, so that this heater operates with a good efficiency. However, the losses involved by the cooling of the heating gases in cooler 14 can not be avoided.

A reduction in losses of the kind just referred to can be brought about if heat exchangers are arranged in the manner illustrated in Fig. 2 within the cooler employed for the heating gases. The device for cooling and purifying the heating gases issuing from the gas producer 40 is subdivided into two halves 28, 29 to which cooling water is supplied through pipes 30 and 31. In each of the halves 28, 29 a surface heat exchanger with vertically arranged tubes 32 and 33 is disposed through which the heating gases to be cooled pass as a parallel current. These function as gas coolers, and are arranged above the outlet of the cooling water supply pipes 30 and 31 respectively. In the heat exchanger 33 the heating gases give up heat to the fresh air which flows in through a pipe 34 and when heating has taken place passes through a pipe 35 into the tubular surface heat exchanger 41. On the other hand in heat exchanger 32 the heating gases that have to be cooled give up heat to the gases that have already been cooled and purified by the extraction of water and tarry products; the last mentioned gases after having taken up heat in the exchanger 32 pass through a pipe 36 to the tubular surface heat exchanger 42. Since the heating gases that have to be cooled only come in contact with the cooling water after having passed through the heat exchangers 32 and 33, said water only has to carry off a relatively small amount of heat. Since fresh air and not merely the purified heating gases take up heat, which becomes available during condensation of the water vapour in the heating gases issuing from the gas producer, it is ensured that this heat is utilized to the best possible extent.

The tarry products and the water which condense can easily flow down the vertical tubes of the heat exchangers 32 and 33. The necessary measures must be taken to ensure that these heat exchangers 32, 33 can be easily installed and removed and their tubes easily cleaned.

In Fig. 2 the heater 45, burner 46 and main surface heat exchanger 47 are structurally and functionally similar to the parts 1, 18 and 2 of Fig. 1.

What is claimed is:

1. The combination of a gas producer having an air inlet connection; means forming a furnace chamber and a passage for leading products of combustion from said chamber; a main heat exchanger of the surface type in said chamber, said exchanger having inlet and discharge connections for passing therethrough a gaseous medium which is to be heated; a burner arranged to deliver heat to said main exchanger, said burner having an inlet connection for combustible gas and an inlet connection for combustion air; two surface heat exchangers in said passage; tubular means for conducting gas from the producer to one of said two exchangers and thence to the gas connection of the burner; and tubular means for conducting combustion air to the other of said two exchangers and thence to the air inlet connections of said burner and producer.

2. The combination defined in claim 1 in which the products of combustion discharging through said passage contact first the exchanger through which gas flows to the burner and then the exchanger through which combustion air flows.

3. The combination of a gas producer having an air inlet connection; means forming a furnace chamber and a passage for leading products of combustion from said chamber; a main heat exchanger of the surface type in said chamber, said exchanger having inlet and discharge connections for passing therethrough a gaseous medium which is to be heated; a burner arranged to deliver heat to said main exchanger, said burner having an inlet connection for combustible gas and an inlet connection for combustion air; two surface heat exchangers in said passage; tubular means for conducting gas from the producer to one of said two exchangers and thence to the gas connection of the burner; tubular means for conducting combustion air to the other of said two exchangers and thence to the air inlet connections of said burner and producer, said tubular means including by-passes leading past said other exchanger to each of said air inlet connections; and individually adjustable valves controlling flow through respective by-passes.

4. The combination of a gas producer having an air inlet connection; means forming a furnace chamber and a passage for leading products of combustion from said chamber; a main heat exchanger of the surface type in said chamber, said exchanger having inlet and discharge connections for passing therethrough a gaseous medium which is to be heated; a burner arranged to deliver heat to said main exchanger, said burner having an inlet connection for combustible gas and an inlet connection for combustion air; two surface heat exchangers in said passage; tubular means for conducting gas from the producer to one of said two exchangers and thence to the gas connection of the burner; tubular means for conducting combustion air to the air inlet connections of said burner and producer, and for causing at least a part of said air to pass through the other of said two exchangers; and individually adjustable means for regulating the extent to which air delivered by said connections to the burner and to the producer, respectively, is heated.

5. The combination of a gas producer having an air inlet connection and a gas discharge; a surface type gas cooler connected to receive and cool gas discharging from the producer; a gas purifier connected to receive cooled gas discharging from said cooler; means forming a furnace chamber and a passage for leading products of combustion from said chamber; a main heat exchanger of the surface type in said chamber, said exchanger having inlet and discharge connections for passing therethrough a gaseous medium which is to be heated; a burner arranged to deliver heat to said main exchanger, said burner having an inlet connection for combustible gas and an inlet connection for combustion air; two surface heat exchangers in said passage; tubular means for conducting gas from said gas purifier to one of said two surface heat exchangers and thence to the gas connection of the burner; and tubular means for conducting combustion air to said gas cooler, from the gas cooler to the other of said two exchangers, and thence to the air inlet connections of said burner and producer.

6. The combination defined in claim 5 in which means are provided to discharge tarry products intercepted by the gas purifier into air flowing to the air inlet of the producer.

7. The combination of a gas producer having an air inlet and a gas discharge; two surface type gas coolers connected in parallel to receive and cool gas discharging from the producer; a gas purifier connected to receive cooled gas discharging from said cooler; means forming a furnace chamber and a passage for leading products of combustion from said chamber; a main heat exchanger of the surface type in said chamber, said exchanger having inlet and discharge connections for passing therethrough a gaseous medium which is to be heated; a burner arranged to deliver heat to said main exchanger, said burner having an inlet connection for combustible gas and an inlet connection for combustion air; two surface heat exchangers in said passage; means including tubular connections for conducting gas from said gas purifier, first through one gas cooler to absorb heat from hot gas being cooled, then through one of said two surface heat exchangers, and thence to the gas connection of the burner; and tubular means for conducting combustion air to the other of said gas coolers, to absorb heat from gas being cooled, then through the other of said two surface heat exchangers, and thence to the air inlet connections of said burner and producer.

RUDOLF RUEGG.